Patented Nov. 21, 1922.

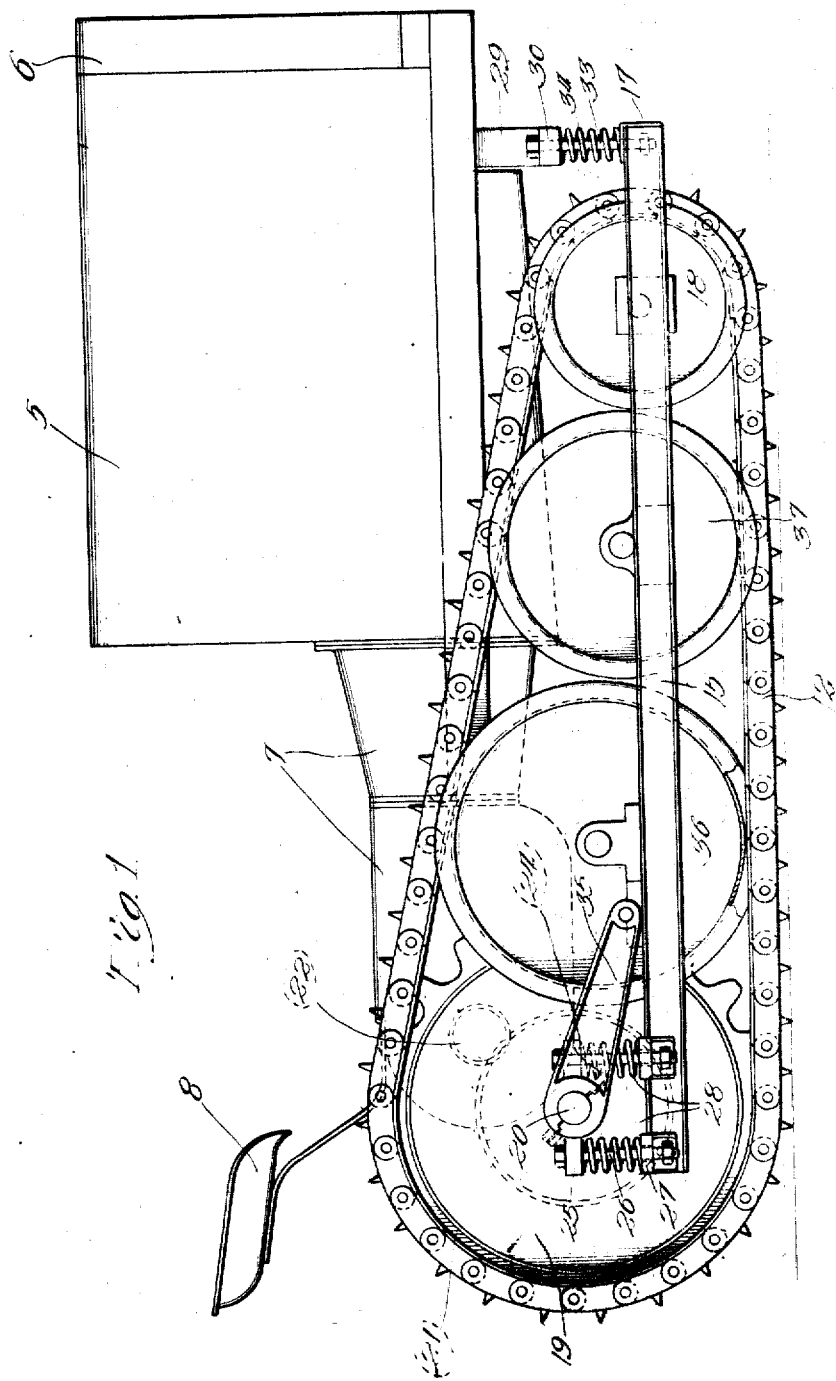

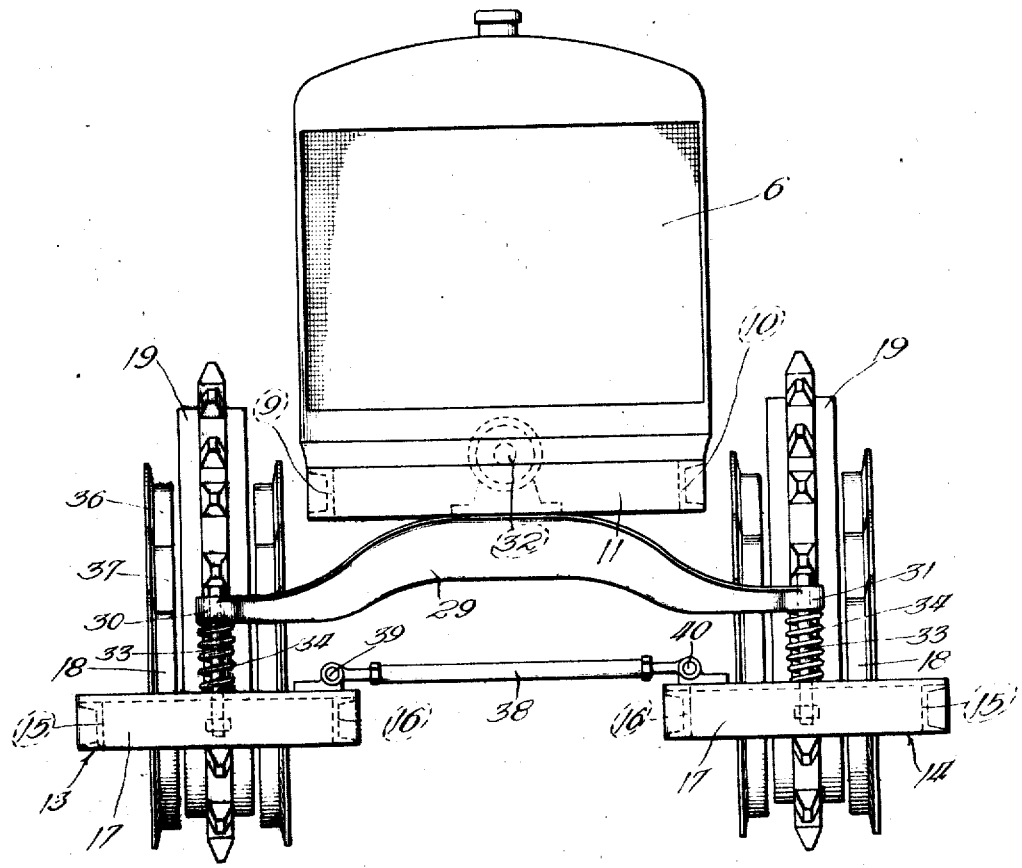

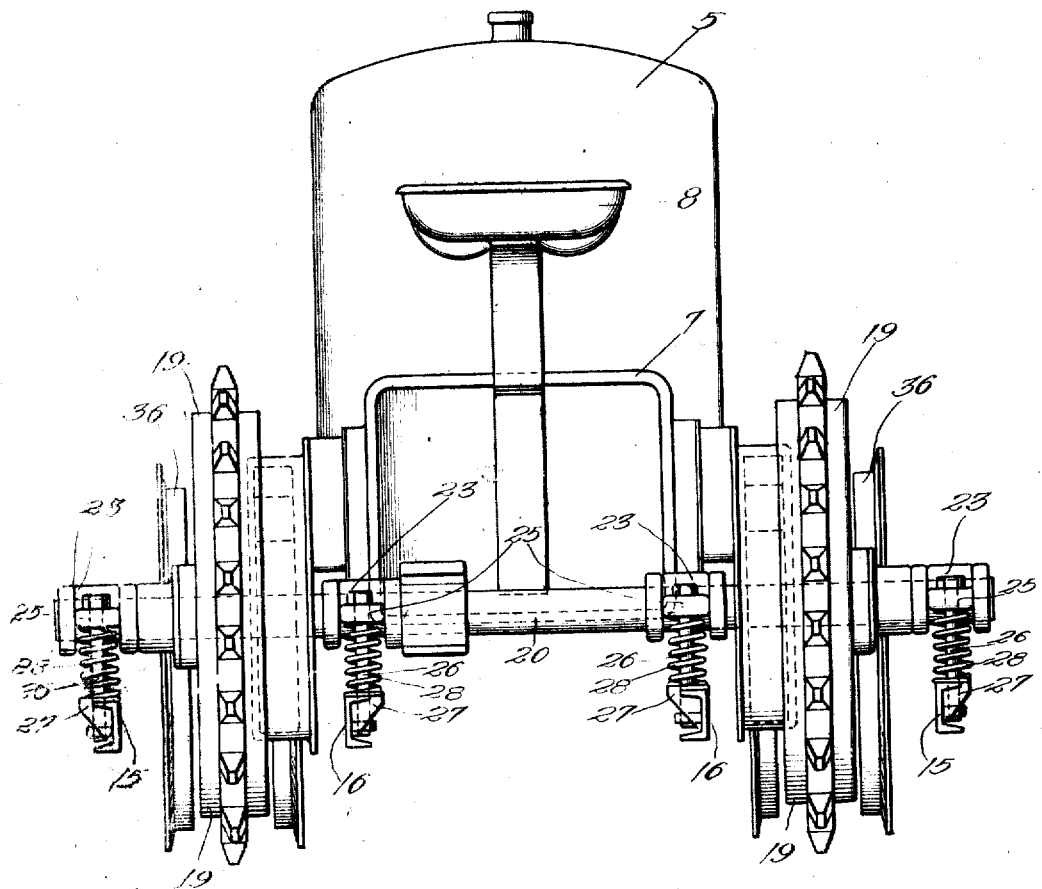

1,436,376

UNITED STATES PATENT OFFICE.

HARRY H. BATES, OF JOLIET, ILLINOIS, ASSIGNOR TO BATES MACHINE AND TRACTOR COMPANY, OF JOLIET, ILLINOIS, A CORPORATION OF DELAWARE.

TRACTOR.

Application filed December 22, 1919. Serial No. 346,710.

*To all whom it may concern:*

Be it known that I, HARRY H. BATES, a citizen of the United States, residing at Joliet, in the county of Will and State of Illinois, have invented certain new and useful Improvements in Tractors, of which the following is a specification.

The present invention has to do with certain improvements in tractors and has particular reference to improvements in tractors intended for use on the farm and for similar purposes. The features of the invention have particular reference to the construction of the tractor mechanism which is of the general type known in the art as a crawler construction.

One of the features of the invention has reference to the manner in which the frame of the tractor is mounted upon and supported by the crawler construction; and in this connection one of the objects is to provide a spring suspension which shall transmit the load to the crawler device in a perfectly equalized manner at all times, and which shall nevertheless permit the crawler chains to ride easily over obstructions or inequalities in the surface of the ground.

Another feature of the invention has to do with the construction whereby the traction exerted by the crawler on the surface of the ground shall be transmitted to the frame of the tractor itself, without distorting the spring suspension, and without the necessity of passing any of the traction load through the spring suspension members. Other objects and uses of the invention will appear from a detailed description of the same which consists in the features of construction and combinations of parts hereinafter described and claimed.

Referring to the drawings:

Figure 1 shows a side elevation of a tractor having applied thereto the features of the present invention;

Fig. 2 is a front end view corresponding to Fig. 1; and

Fig. 3 is a back end view corresponding to Figs. 1 and 2.

The features of the present invention are illustrated for purposes of convenience as being embodied within that general type of tractor construction in which the engine and radiator are located in the front portion of the machine and the driver's seat, and various controlling devices are located in the back portion thereof. This is generally largely as a matter of convenience in illustration, and because this is a familiar type of construction, but it will be understood that in so illustrating the features of the present invention, I do not limit their use to this particular type of tractor construction.

Bearing the foregoing in mind, the construction illustrated in the drawings includes an engine located under the hood 5; a radiator 6; various clutch and change speed devices located under the casings 7; a driver's seat 8 and any other suitable devices which may be desirable or necessary. These are all carried by a frame which is more or less rigid in character and includes the side beams or channels 9 and 10 and the front cross piece 11. Other cross pieces may be provided at various points, or the frame of the engine and the frames within which the clutch and general speed devices are located may be used for providing additional rigidity between the side beams.

At each side of the tractor there is provided a chain drive or crawler 12 as shown in Fig. 1. These crawlers carry all or a large portion of the weight of the machine, and serve also to exert the traction on the surface of the ground. Owing to the fact that the two sides of the machine may be simultaneously passing over unequal ground surfaces, it is very desirable to provide a construction such that the two crawlers may move up and down independently of each other, or at any rate to provide such construction that a considerable amount of independent movement and flexibility will be provided. These results are secured in the construction herein illustrated and described.

At each side of the machine there is provided a crawler frame, the two frames being designated in their entirety by the numerals 13 and 14. Each of these frames includes sides beams or channels 15 and 16 in conjunction with a front cross piece 17. These frames are, therefore, of U-shape form when viewed from above.

In the front portion of each crawler frame there is journaled an idler wheel 18, and a driving sprocket wheel 19 is located or journaled between the rear portions of the arms of these U-shaped frames. This journaling is conveniently accomplished by providing a fixed axle 20 extending across the rear portion of the frame of the machine, the driving sprocket wheel 19 being journaled on the projecting portions thereof. Each driving sprocket is provided with a gear 21 with which there meshes a pinion 22, the pinions on the two sides of the machine being driven from the change speed gearing preferably through a differential connection, or these pinions may be driven in any other suitable manner. In any case, however, it will be observed that since the driving sprockets 19 operate on fixed centers a proper cushioning is always secured between the gears 21 and pinions 22.

On the projecting portion at each end of the fixed axle 20 there is located a pair of boxes or carriers 23 each having the forwardly and rearwardly extending arms 24 and 25 respectively. One of these boxes or carriers is located above the inner arm or beam 16 of the corresponding crawler frame, and the other is located above the outer arm or beam of the same crawler frame.

Extending downwardly from each of the arms 24 and 25 of each carrier is a pin or reach rod 26, the lower end of which is slidably or movably mounted with respect to a block 27 carried by the end portion of the corresponding crawler frame bar. These pins or reach rods serve to limit the separation of the crawler frame bars from the corresponding blocks 23. Coiled springs 28 surround the pins or reach rods and serve to transmit the load from the blocks 23 to the frame bars.

In the front portion of the machine there is provided a yoke 29 having its end portions 30 and 31 reaching to positions above the front ends of the crawler frames, and the central portion of such yoke carries the front end of the main frame of the crawler by means of a swiveled or pivoted support 32 as is clearly illustrated in Fig. 2. A pin or reach rod 33 extends between each end of the yoke and the corresponding crawler frame and serves to limit the amount of separation between these parts. A coiled spring 34 surrounding each of these pins or reach rods serves to transmit load from the engine of the yoke to the corresponding crawler frame.

From the description thus far given, it will appear that each of the crawler frames may oscillate or swing up and down independently of the other about a pivoted or swiveled connection at its rear end; and it will also appear that, by reason of the spring supports so provided, it is possible to equalize the load of the main portion of the tractor upon the two crawlers and permit the crawlers to adjust themselves independently according to the irregularities in the surface of the ground. It will be evident that the very large traction exerted by each crawler upon the surface of the ground would tend to displace the same forwardly with respect to the frame of the machine, and would probably cause a serious distortion of the spring supports. I have, therefore, provided a link 35 extending from each crawler frame to the end portion of the fixed axle 20, and as a matter of convenience and construction, and in order to equalize the loads and operation, one of these links may be provided reaching from each of the arms or bars of each crawler frame to the fixed axle.

It will be observed that by this arrangement, the forward pull is transmitted directly between the crawler frame and the main frame of the machine, so that the spring supports are relieved of any distorting loads or thrusts. The end portions of the links 35 are preferably pivoted as illustrated, particularly in Fig. 1, so that the links will not in any manner interfere with or impede the adjustment movements of the crawler frames.

In those cases in which the crawlers are relatively long, it will some times be desirable or advantageous to place one or more idlers 36 and 37 between the driving sprocket 19 and the front idler 18 so as to ensure a practically uniform pressure upon each crawler chain or crawler throughout its length. These supplemental idlers may be conveniently journaled between the arms of the crawler frames, as shown in Fig. 1, and each of them may comprise simply a flanged wheel, as will be clearly evident from an examination of Figs. 2 and 3.

In order to steady the operation of the machine and to give a better support for the front portions of the crawler frames, I have illustrated a link 38 extending between the front portions of the crawlers and having its end portions pinned or journaled to the front portions of the crawler frames at the points 39 and 40, as shown in Fig. 2.

I claim:

1. In a tractor, the combination with the main frame and suitable prime mover and controlling devices thereon, of a fixed axle in the rear portion of the main frame, a pair of forwardly extending crawler frame bars on each side of the machine, the rear ends of each pair of bars being located beneath the adjacent end of the fixed axle, a connection joining together the forward portions of each pair of said bars, a crawler sprocket journaled on each end of the fixed axle between the rear portions of the corresponding crawler frame bars, a plurality of pulleys journaled between the frame bars at each side of the machine, a crawler chain passing over each sprocket and the corresponding pulleys, a driving connection between each sprocket and the prime mover mechanism, a transverse yoke having its end portions located above the forward ends of the crawler frames, a pivotal support for the forward portion of the main frame, and the central portion of said yoke, a spring support for each end of the yoke above the forward portion of the corresponding crawler frame, and a link connection between the rear portion of each crawler frame bar and the adjacent projecting end of the fixed axle, substantially as described.

2. The combination with the main frame and prime mover and controlling devices of a tractor, of a crawler device at each side of the machine, a fixed axle extending across the rear portion of the main frame, each crawler device including a U-shaped crawler frame having the rear ends of its arms located beneath the adjacent projecting end of the fixed axle, a driving sprocket for each crawler device journaled on the adjacent projecting end of the fixed axle and located between the rear ends of the arms of the adjacent crawler frame, a plurality of pulleys journaled in each crawler frame, a crawler chain passing over each sprocket and the corresponding pulleys, a link connection between the rear portion of each crawler frame and the adjacent projecting end of the fixed axle, a spring support between each end of the fixed axle and the rear end portions of the adjacent crawler frame, a transverse yoke in the forward portion of the machine, a spring connection between each end of said yoke and the forward portion of the adjacent crawler frame, and a pivotal connection between the forward portion of the main frame and the central portion of said yoke, substantially as described.

3. The combination with the main frame and prime mover and driving devices of a tractor, of a crawler device located at each side of the tractor, each crawler device including a U-shaped crawler frame having its rear ends adjacent to the rear portion of the main frame, a driving sprocket pivoted with respect to the main frame and between the rear portions of the arms of each crawler frame, a plurality of pulleys journaled between the arms of each crawler frame, a crawler chain passing over each sprocket and the corresponding pulleys, a spring support connection between the rear portions of the arms of each crawler frame and the rear portion of the main frame, a link connection between each crawler frame and the rear portion of the main frame, a transverse yoke in the front portion of the machine, a spring support connection between each end thereof and the front portion of the corresponding crawler frame, and a pivotal support connection between the central portion of said yoke and the front portion of the main frame, substantially as described.

HARRY H. BATES.